(12) United States Patent
Ferren et al.

(10) Patent No.: US 9,414,125 B2
(45) Date of Patent: Aug. 9, 2016

(54) REMOTE CONTROL DEVICE

(75) Inventors: Bran Ferren, Beverly Hills, CA (US);
Cory J. Booth, Beaverton, OR (US);
Genevieve Bell, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 175 days.

(21) Appl. No.: 13/818,939

(22) PCT Filed: Aug. 25, 2011

(86) PCT No.: PCT/US2011/049219
§ 371 (c)(1),
(2), (4) Date: Feb. 25, 2013

(65) Prior Publication Data
US 2013/0154811 A1    Jun. 20, 2013

Related U.S. Application Data

(60) Provisional application No. 61/377,588, filed on Aug. 27, 2010.

(51) Int. Cl.
G05B 11/01 (2006.01)
H04N 21/63 (2011.01)
(Continued)

(52) U.S. Cl.
CPC ............... *H04N 21/632* (2013.01); *G01S 5/20* (2013.01); *G06F 3/017* (2013.01); *G06F 3/0346* (2013.01); *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0485* (2013.01); *G06K 9/3266* (2013.01); *G06N 5/02* (2013.01); *G06Q 30/0201*
(2013.01); *G08C 17/00* (2013.01); *G08C 17/02* (2013.01); *G08C 19/00* (2013.01); *H04L 65/403* (2013.01); *H04N 5/4403* (2013.01); *H04N 5/44504* (2013.01); *H04N 5/91* (2013.01); *H04N 21/4147* (2013.01);
(Continued)

(58) Field of Classification Search
CPC ....... G08C 19/28; G08C 23/04; H04R 25/558
USPC ...................... 340/12.5, 12.22, 5.64; 341/176
See application file for complete search history.

(56) References Cited

U.S. PATENT DOCUMENTS 6,072,467 A     6/2000   Walker
6,603,420 B1 *  8/2003   Lu ................................ 341/176
(Continued)

FOREIGN PATENT DOCUMENTS

JP   2002-135859   5/2002
JP   2008027121    2/2008
(Continued)

OTHER PUBLICATIONS

Office Action received for Japanese Patent Application No. 2013526161, mailed Feb. 12, 2014, 6 pages including 3 pages English translation.
(Continued)

Primary Examiner — Vernal Brown

(57) ABSTRACT

An apparatus may include a housing that has a substantially equiaxed shape. The apparatus may include a motion sensor that detects a rotational state of the apparatus and a processor that produces control signals based upon the rotational state. The control signals may control operation of an external device. Other embodiments are described and claimed.

26 Claims, 16 Drawing Sheets

(51) Int. Cl.
| | |
|---|---|
| H04N 21/437 | (2011.01) |
| G06F 3/041 | (2006.01) |
| G06K 9/32 | (2006.01) |
| H04N 5/445 | (2011.01) |
| H04N 21/431 | (2011.01) |
| H04N 21/654 | (2011.01) |
| G08C 17/00 | (2006.01) |
| G08C 17/02 | (2006.01) |
| G08C 19/00 | (2006.01) |
| G06F 3/048 | (2013.01) |
| G06N 5/02 | (2006.01) |
| G01S 5/20 | (2006.01) |
| H04N 21/45 | (2011.01) |
| H04N 21/488 | (2011.01) |
| H04N 5/91 | (2006.01) |
| H04N 5/44 | (2011.01) |
| G06F 3/0485 | (2013.01) |
| H04L 29/06 | (2006.01) |
| G06Q 30/02 | (2012.01) |
| H04N 21/436 | (2011.01) |
| H04N 21/422 | (2011.01) |
| H04N 21/443 | (2011.01) |
| G06F 3/01 | (2006.01) |
| G06F 3/038 | (2013.01) |
| G06F 3/0482 | (2013.01) |
| G06F 3/0481 | (2013.01) |
| H04N 21/482 | (2011.01) |
| G06F 3/0346 | (2013.01) |
| H04N 21/4147 | (2011.01) |
| H04N 21/433 | (2011.01) |
| H04N 21/81 | (2011.01) |
| H04N 21/475 | (2011.01) |

(52) U.S. Cl.
CPC ....... *H04N21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4532* (2013.01); *H04N 21/482* (2013.01); *H04N 21/4882* (2013.01); *H04N 21/63* (2013.01); *H04N 21/654* (2013.01); *G08C 2201/32* (2013.01); *H04N 21/4755* (2013.01); *H04N 21/8133* (2013.01); *H04N 2005/44556* (2013.01)

(56) References Cited

U.S. PATENT DOCUMENTS

| | | | |
|---|---|---|---|
| 8,106,795 | B2 | 1/2012 | Kataoka |
| 8,132,120 | B2 * | 3/2012 | Stallings et al. .............. 715/848 |
| 8,417,296 | B2 * | 4/2013 | Caballero et al. ............. 455/566 |
| 2002/0069415 | A1 * | 6/2002 | Humbard ............ G06F 3/04815 725/52 |
| 2005/0110773 | A1 | 5/2005 | Chapman et al. |
| 2007/0050061 | A1 * | 3/2007 | Klein et al. .................... 700/94 |
| 2007/0247439 | A1 | 10/2007 | Daniel et al. |
| 2008/0084328 | A1 * | 4/2008 | Crichton ................. 340/825.19 |
| 2009/0040175 | A1 | 2/2009 | Xu et al. |
| 2009/0158203 | A1 | 6/2009 | Kerr et al. |
| 2009/0179586 | A1 | 7/2009 | Cortenraad et al. |
| 2009/0212939 | A1 * | 8/2009 | Richmond ............... 340/539.11 |
| 2009/0241052 | A1 * | 9/2009 | Ha et al. ....................... 715/772 |
| 2009/0267897 | A1 | 10/2009 | Ootsuka |
| 2009/0322552 | A1 | 12/2009 | Machimura et al. |
| 2010/0164993 | A1 | 7/2010 | Yoshida |

FOREIGN PATENT DOCUMENTS

| | | |
|---|---|---|
| JP | 2009-100366 | 5/2009 |
| JP | 2009294928 | 12/2009 |
| JP | 2010-157930 | 7/2010 |

OTHER PUBLICATIONS

International Preliminary Report on Patentability received for PCT Patent Application No. PCT/US2011/049219, mailed Mar. 14, 2013, 7 pages.

Office Action received for Japanese Patent Application No. 2013-526161, mailed Nov. 4, 2014, 6 pages including 3 pages English translation.

Extended European Search Report received for European Patent Application No. 11820679.6, mailed Mar. 5, 2015, 10 pages.

* cited by examiner

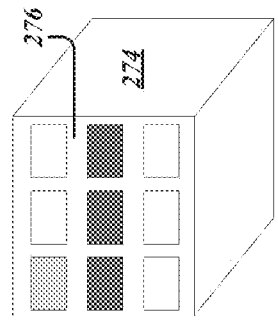
FIG. 10c
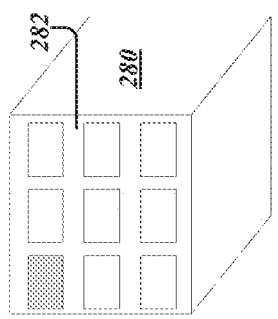
FIG. 10f
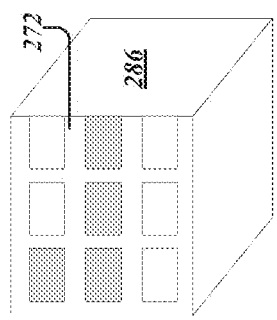
FIG. 10i
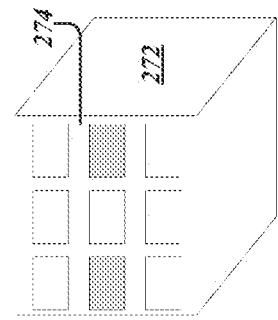
FIG. 10b
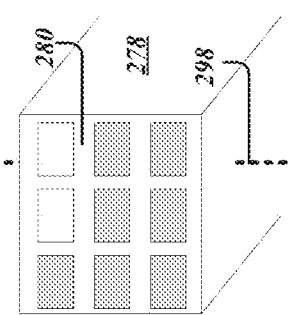
FIG. 10e
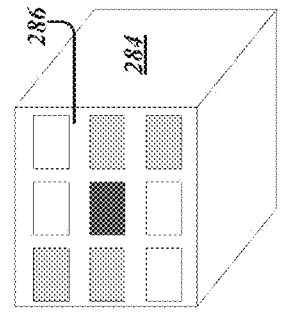
FIG. 10h
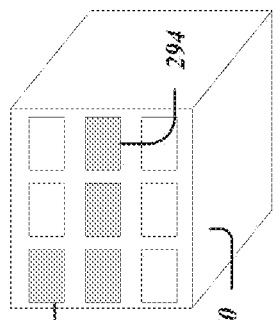
FIG. 10a
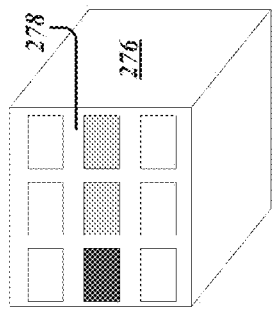
FIG. 10d
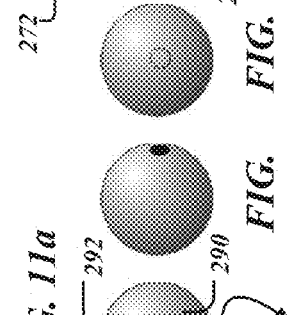
FIG. 10g
FIG. 11a
FIG. 11b
FIG. 11c
FIG. 11d
FIG. 11e
FIG. 11f
FIG. 11g
FIG. 11h
FIG. 11i

REMOTE CONTROL DEVICE

RELATED APPLICATIONS

This application claims priority to U.S. Provisional Patent Application Ser. No. 61/377,588 filed Aug. 27, 2010, which is incorporated herein by reference in its entirety.

BACKGROUND

Control of home electronics is becoming increasingly complex as numerous heterogeneous electronic devices are found in a typical home, including televisions, audio equipment, video game equipment, home theater equipment, computing devices, communications devices, and the like. There has also been a trend to increase the complexity of remote control devices that are used to control one or more external electronic devices. Because of the complexity of remote controls, a user's experience in interacting with the desired electronic devices through the remote control is often less than ideal. Accordingly, there may be a need for improved techniques to solve these and other problems.

BRIEF DESCRIPTION OF THE DRAWINGS

FIG. 4b illustrates an example of an external device that may be controlled using the remote control of FIG. 4a.

FIGS. 10a-i illustrate operation of an embodiment of a virtual cube.

FIGS. 11a-i illustrate operation of an embodiment of a remote control.

DETAILED DESCRIPTION

Figure 1:
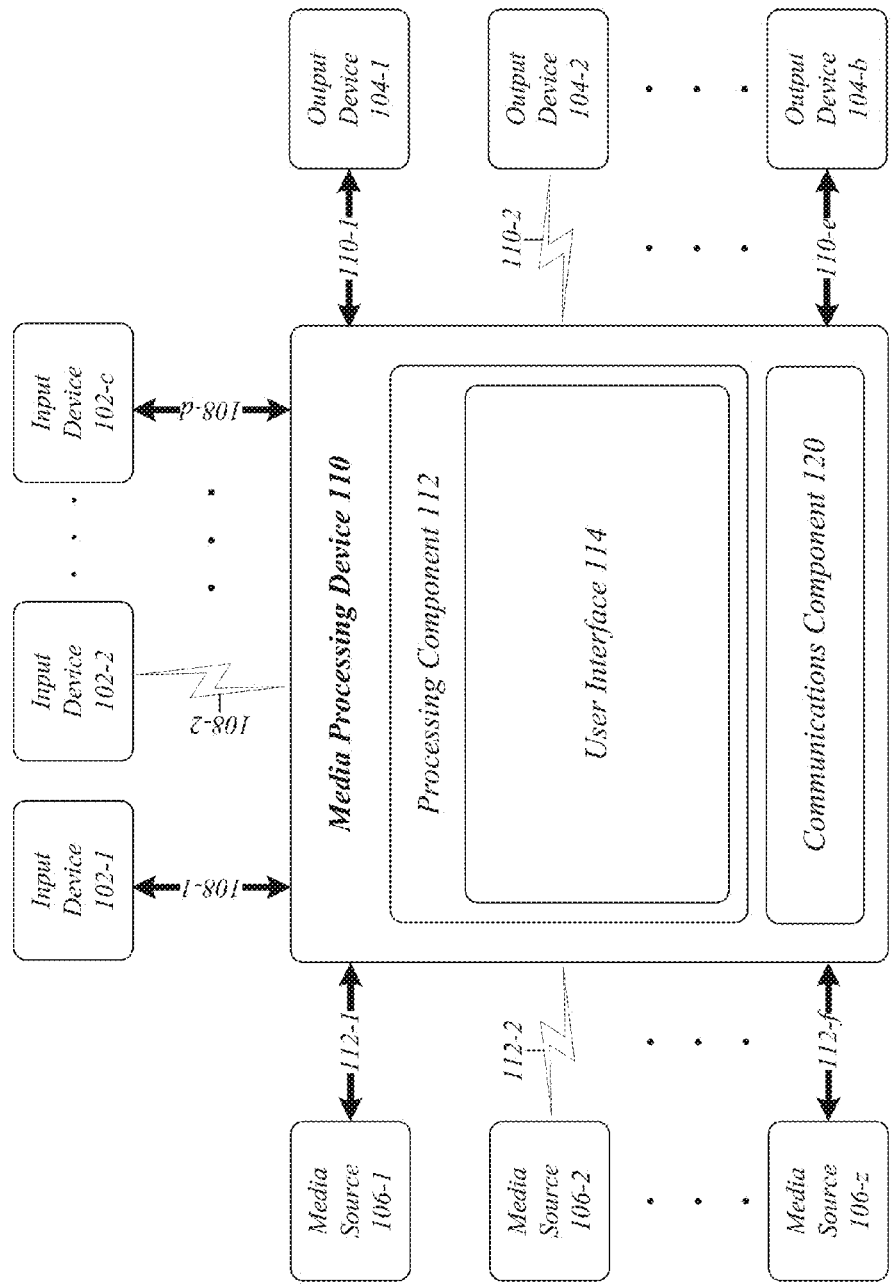
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in a functionally seamless and easily understood manner.

The digital home system may include, in various embodiments, a multi-axis integrated on-screen navigation allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to remote control devices that have substantially different shape and geometry relative to conventional remote controls. In some embodiments a remote control device (also termed "remote control" herein) may have a generally spherical shape while in other embodiments a remote control device may have a polyhedral shape, such as a cube shape. As detailed below, user interaction with remote control devices arranged according to the present embodiments may be substantially different than with known remote controls because of different shapes, different user interfaces, and sensors provided by remote controls of the present embodiments. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-a, one or more output devices 104-b, and one or more media sources 106-c. The media processing device 110 may be communicatively coupled to the input devices 102-a, the output devices 104-b, and the media sources 106-c via respective wireless or wired communications connections 108-d, 110-e and 112-f.

It is worthy to note that "a" and "b" and "c" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

In various embodiments, the media processing system 100 may include one or more input devices 102-a. In general, each input device 102-a may comprise any component or device capable of providing information to the media processing device 110. Examples of input devices 102-a may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-b. An output device 104-b may comprise any electronic device capable of reproducing, rendering or presenting media content for consumption by a human being. Examples of output devices 104-b may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

While various embodiments refer to input devices 102-a providing information to media processing device 110 and output devices 104-b receiving information from media processing device, it should be understood that one or more of the input devices 102-a and output device 104-b may allow for the exchange of information to and from media processing device 110 via their respectively connections 108-d and 110-e. For example, one or more of input devices 102-a may be operative to provide information to media processing device 110 and to receive information from media processing device 110. In various embodiments, one or more output devices 104-b may be operative to receive information from media processing device 110 and may also be operative to provide information to media processing device 110. Similarly, there may be a bi-directional exchange between the media processing device 110 and media sources 106-c. For instance, a media source 106-c may be operative to provide media information to the media processing device 110 and to receive information from the media processing device 110. An example of this would be a video on demand (VOD) application implemented by the media processing device 110. The embodiments are not limited in this context.

In one embodiment, for example, the media processing system 100 may include a display 104-1. The display 104-1 may comprise any analog or digital display capable of presenting media information received from media sources 106-c. The display 104-1 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

In various embodiments, the media processing device 110 may comprise a user interface. User interface 114 is shown as part of media processing device 110 for purposes of illustration and not limitation. It should be understood that user interface could be located in other devices, components or nodes of media processing system 100 in various embodiments and still fall within the described embodiments.

Figure 2:
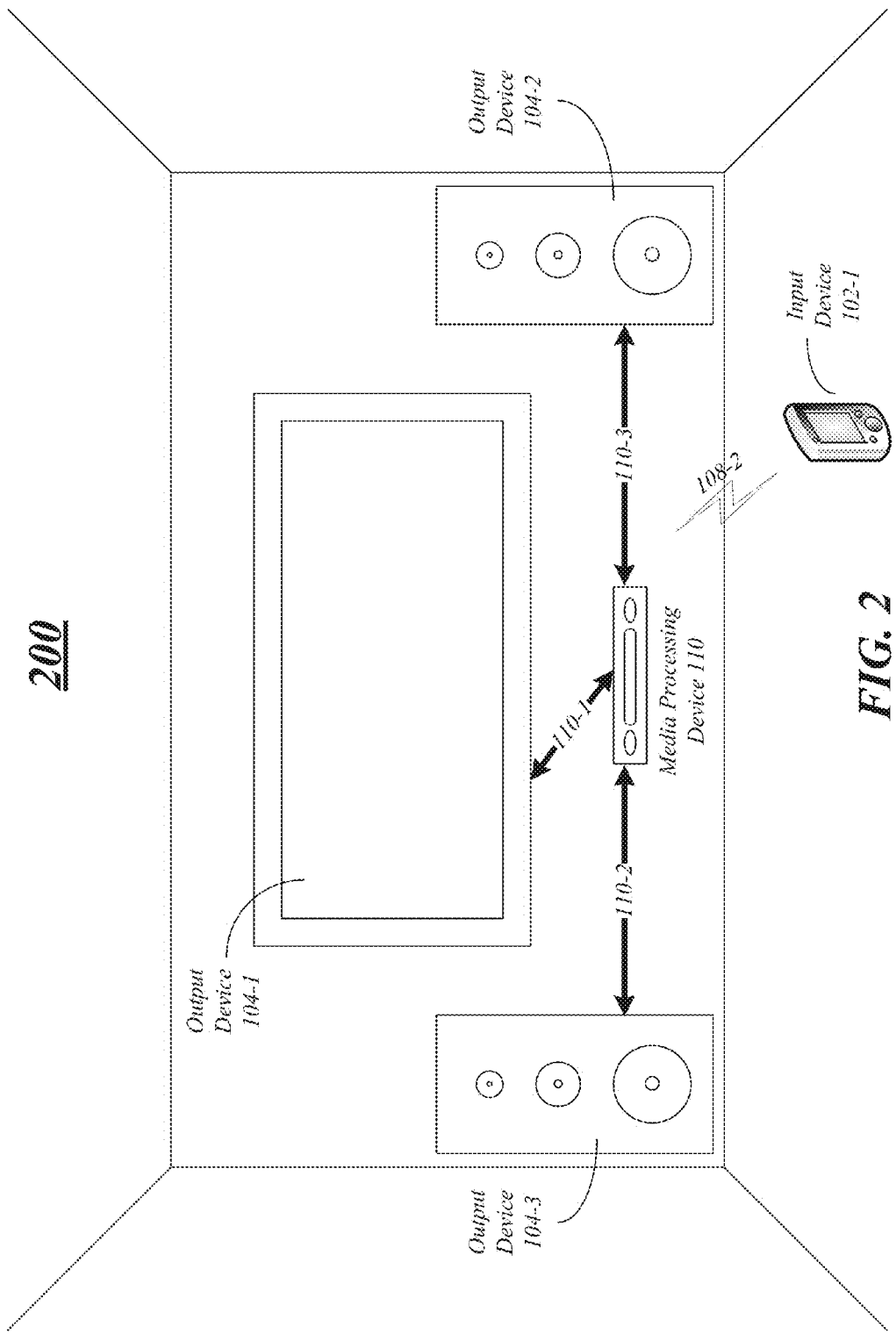
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown). The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 100 may form or comprise one example embodiment of digital home entertainment system. The embodiments are not limited to the type, number or arrangement of components illustrated in FIG. 2.

Figure 3A:
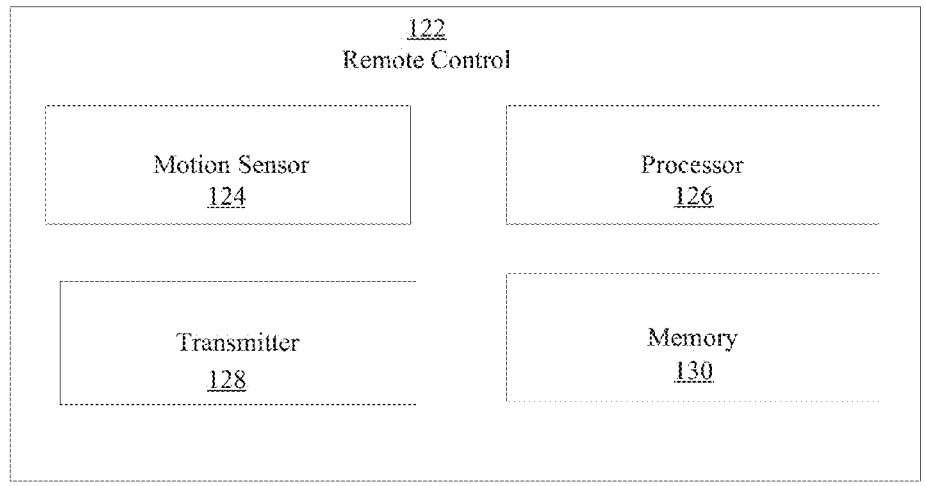
FIG. 3a illustrates one embodiment of a remote control.
Figure 3B:
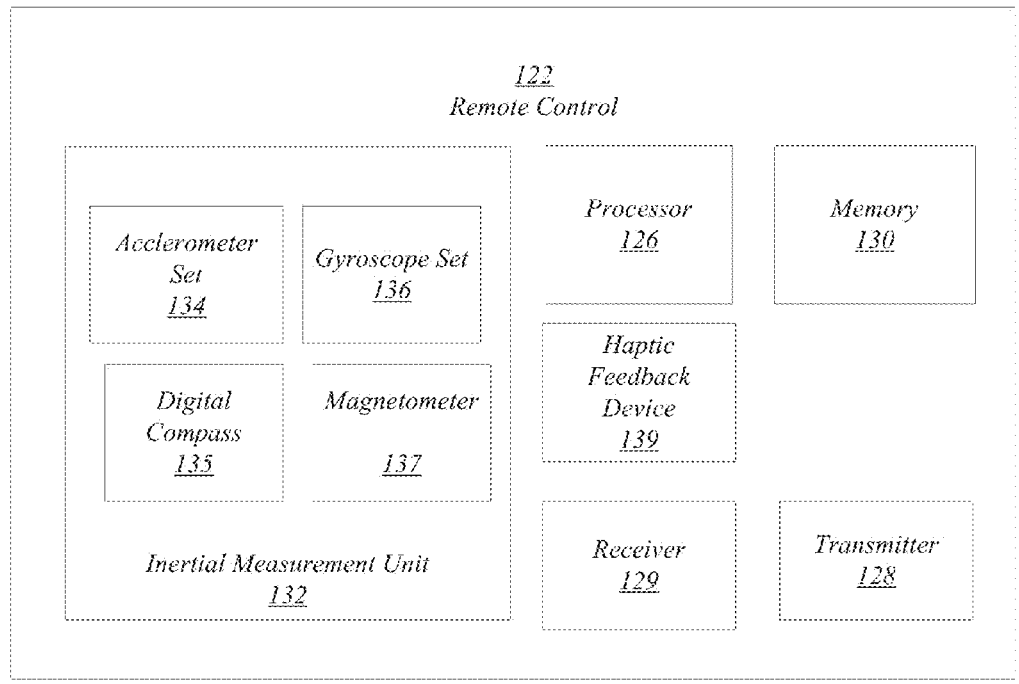
FIG. 3b illustrates another embodiment of a remote control.
Figure 3C:
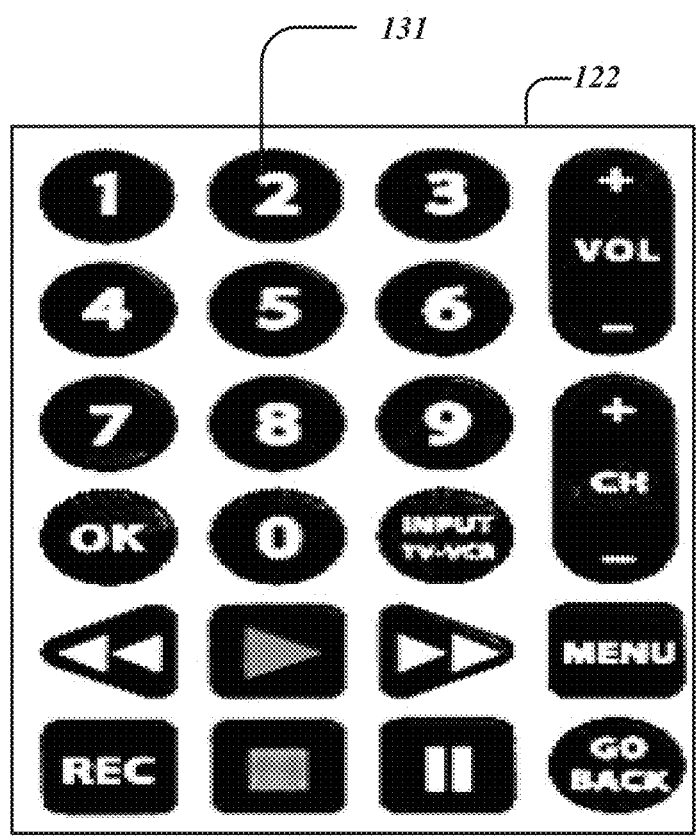
FIG. 3c illustrates a further embodiment of a remote control.

FIGS. 3a-3c depict various embodiments of a remote control 122. In various embodiments, the remote control 122 may be used to control operation of devices including televisions, audio equipment, video game equipment, home theater equipment, hybrid electronic devices, computing devices, communications devices, and other devices. In some embodiments, remote control 122 may control any of the devices depicted in media processing system 100 or digital home system 200. As depicted in FIG. 3c, in various embodiments remote control 122 may include a keypad 131 that contains multiple buttons as is common in present day remote control devices. However, in other embodiments, as detailed below, a remote control may be wholly controlled by gesture and other mechanisms The remote control 122 includes a motion sensor 124, which may detect motion of the remote control itself. The term "motion sensor" as used herein, generally refers to a set of devices that are arranged to detect the motion of the remote control itself and not arranged to detect motion of external objects. The motion sensor 124 may detect a translational or rotational movement of the remote control according to various embodiments. The term "translational," as used herein, refers to a motion in which the position of the center of the remote control moves, as opposed to a rotational movement, which may involve a stationary center (or other point) of the remote control while the remote control rotates about an axis. This information may be transmitted to other devices in the remote control 122 or external to the remote control. In one example, the motion sensor may detect that a remote control has been picked up after being stationary for a period of time. This detection may then trigger other actions as described in more detail below. For example, in various embodiments, translational or rotational movement of the remote control 122 may be used to interact with and control operations in external devices.

Remote control 122 also includes a processor 126, which may be coupled to motion sensor 124 to receive signals from the motion sensor. The processor 126 may interpret the signals received from motion sensor 124 in order to determine the state of the remote control. The processor 126 may, for example, execute a sequence of operations, which may be stored in the processor or in memory 130 of remote control 122. For example, based upon detected motion of the remote control, the processor 126 may send control signals to be used to control operation of an external device.

Remote control 122 further includes a transmitter 128, which may be used to transmit a signal, such as a control signal, to an external device. The transmitter may employ an infrared signal, a radio frequency signal, or other wireless signal according to various embodiments. The transmitter 128 may be coupled to motion sensor 124 and may be coupled to processor 126 in order to receive signals that may be forwarded or used by transmitter 128 to produce control signals to be sent to an external device.

In operation, a user may move remote control 122 in one or more ways in order to control the operation of an external device. Upon moving the remote control in a particular manner, control signals are sent to control the external device according to the particular motion detected.

FIG. 3b provides another embodiment of remote control 122 in which an inertial measurement unit (IMU) 132 is included in the remote control. The IMU 132 may act as a motion sensor to detect various types of motion. In particular, using IMU 122 the remote control may changes in velocity and orientation of the remote control. IMU 132 includes accelerometer set 134 and gyroscope set 136. The accelerometer set 134 may be used to detect acceleration of the remote control in one or more different directions. The gyroscope set 136 may be used to detect rotation of the remote control 122 with respect to one or more rotational axes. The IMU 132 may therefore be used to detect an acceleration state of the remote control 122. For example, when the remote control 122 is picked up from a horizontal surface, IMU 132 may detect a vertical acceleration. This information may be used by remote control 122 to send control signals to an external device. On the other hand, when the remote control 122 is not undergoing acceleration, the IMU may detect that the remote control 122 is in a "zero" acceleration state and this information may be used to produce control signals or to modify control signals as described in detail below. In some embodiments the IMU 132 may also include a digital compass 135 or magnetometer 137 in order to more accurately measure pointing direction and relative bearing. Although in many circumstances it may not be necessary for remote control 122 to perform a cardinal direction measurement, relative measurement of pointing direction may be useful to increase the accuracy of remote control heading calculations.

The IMU 132 may also detect a rotational state of remote control 122. In some embodiments, IMU 132 may detect an absolute rotational position (orientation) with respect to a given axis of the remote control (not shown) or may detect a relative rotational motion of the remote control 122 when a user is rotating the remote control. In various embodiments, the remote control 122 may use different combinations of acceleration state information and rotational state information derived from IMU 132 to control another device.

Remote control 122 also includes a receiver 129, which may receive wireless information to control operation or update the remote control 122. In further embodiments, as discussed below with respect to FIGS. 5a-5f, remote control 122 may include a haptic feedback device 139.

In various embodiments, the housing of a remote control has a generally equiaxed shape, a departure from known remote control devices, which tend to be elongated and flat. The terms "generally equiaxed," "substantially equiaxed," or "equiaxed," refer to an object in which the dimensions in three mutually orthogonal directions are within about a factor of two of one another. Thus, a sphere, a cube, and a chicken egg, may all be considered generally equiaxed or substantially equiaxed, as compared to a stapler, a glasses case, or a cellular telephone handset, which are generally not equiaxed.

Figure 4A:
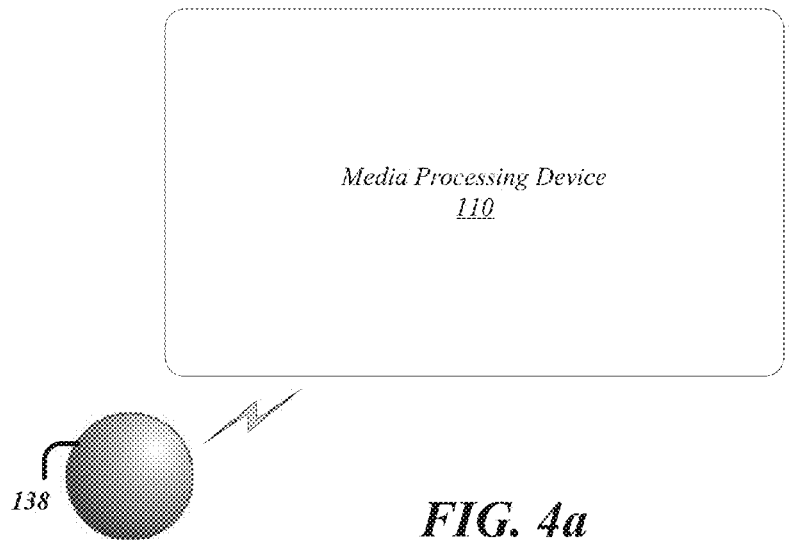
FIG. 4a illustrates one embodiment of another remote control.

FIG. 4a depicts one embodiment of a remote control 138 in which the remote control has a generally spherical shape. The remote control 138 may include the components of remote control 122 as discussed above with respect to FIGS. 3a and 3b. The size of remote control 138 in various embodiments is in a range that provides for convenient manual manipulation by a user. For example, the remote control 138 may have a diameter of a few centimeters up to about ten centimeters or so. As depicted in FIG. 4a, the remote control 138 may have an uncluttered surface with few or no buttons. Instead, many control functions of remote control 138 may be performed by a combination of motions of the remote control 138, such as rotational or translational movement of the remote control 138.

As shown, remote control 138 is wirelessly linked to media processing device 110. This wireless connectivity may be through radio frequency, infrared signal, or other methodology according to various embodiments. In various embodiments, rotational or other movements of remote control 138 cause control signals to be sent wirelessly to media processing device 110. The various movements of the remote control 138 may be more intuitively mapped to functions to be controlled on the external device, thereby improving user interaction with the external device.

Figure 4B:
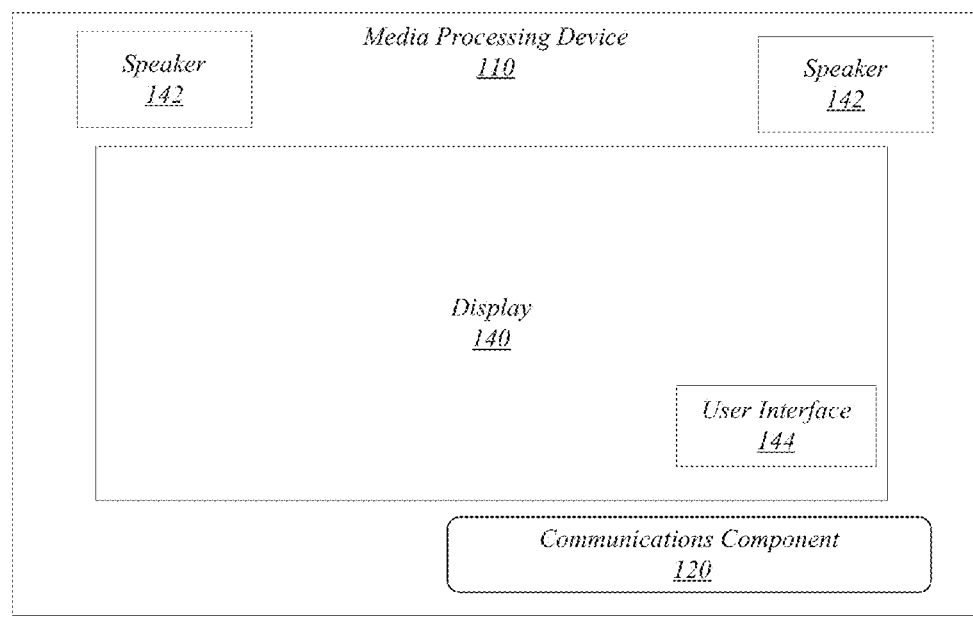

FIG. 4b depicts another example of an external device that may be controlled using remote control 138 according to further embodiments. In some embodiments, the external device is a media processing device 110, which may be a television, computer, videogame, home theatre, or hybrid device such as a digital home system that combines the functionality of multiple technologies, such as television, internet functions, computing, gaming, and telecommunications. As depicted, media processing device 110 may include a display 140, speakers 142, and communications component 120 which may wirelessly communicate with other devices, such as a remote control.

As detailed below, a user may interact with an external device using remote control 138 in various ways. In some embodiments, the remote control 138 may be arranged to control functions in media processing device 110, such as audio volume, television channels, display brightness, and other functions. For example, rotation of the remote control 138 may be used to control the volume of speakers 134. In one embodiment, rotation of the remote control 138 in a clockwise direction about an axis (not shown) orthogonal to the surface of display 140 as viewed from in front of the display may cause the volume of speakers 134 to increase, while rotation in a counterclockwise direction may cause the volume in speakers 134 to decrease.

In some embodiments, the remote control 138 may interact with a user interface 144 of media processing device 110. For example, when remote control 138 is used to control the volume of speakers 134, a visual display of volume settings may be presented in user interface 144 to reinforce to the user what function is being controlled. In further embodiments, the remote control 138 may be arranged to navigate through a menu that is provided in user interface 144 of display 140. In still other embodiments, as discussed below, the remote control 138 may be arranged to both control volume, change channels, and similar functions, as well as navigate through a user interface 144.

In some embodiments, remote control 138 may have no buttons. In accordance with one no-button embodiment, remote control 138 may be arranged to navigate through a graphical user interface, such as user interface 144. In some embodiments, the user interface 144 may provide a means to select televisions channels, select internet content, and the like. For example, the user interface 144 may provide a series of hierarchical menus. In some embodiments, a set of pre-defined movements may be mapped onto navigation functions used to navigate within the user interface 144. For example, the remote control 138 may be arranged such that a tap imparted to remote control 138 is detected by inertial measurement unit 132 (see FIG. 3*b*) within the remote control 138, which sends signals to processor 126 indicating a detected movement. Processor 126 then directs transmitter 128 to transmit signals that initiate an action displayed in user interface 144. In one instance, when an icon corresponding to a desired movie is highlighted in user interface 144, a tap of remote control 138 may cause that movie to be selected. On the other hand, a shake of the remote control, which may be detected by an IMU, may trigger remote control 138 to send signals to media processing device 110 that causes the appearance of a higher menu level than the one currently shown. In other scenarios, shaking of remote control 138 may reverse a previous action. Accordingly, the use of shaking and tapping may provide a convenient and intuitive manner for navigating upward and downward through menus or similar structures in an external interface, such as user interface 144. In various embodiments, the spherical remote control 138 may have a marking on its surface to indicate an ideal pointing direction, as illustrated in FIGS. 11*a*-11*i*. This may remove any rotational ambiguity caused by having only concrete knowledge of a single down vector (i.e. direction of gravitational pull). In some embodiments, a surface marking may have a tactile quality that distinguishes it from other portions of a surface of the remote control in addition to its different visual appearance.

Figure 5A:
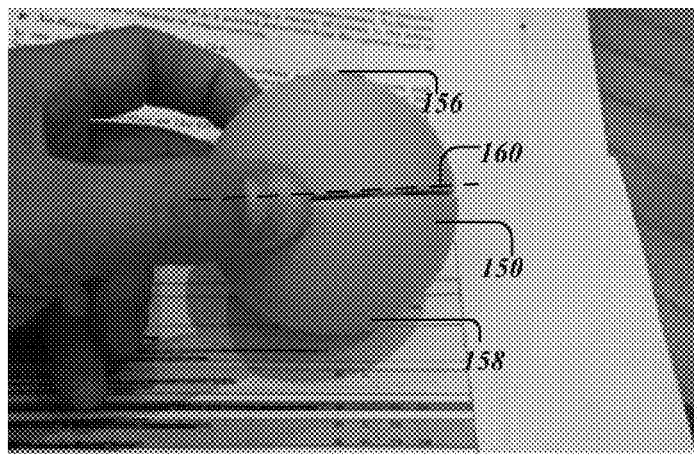
FIGS. 5a-5c illustrate another remote control embodiment.
Figure 5B:
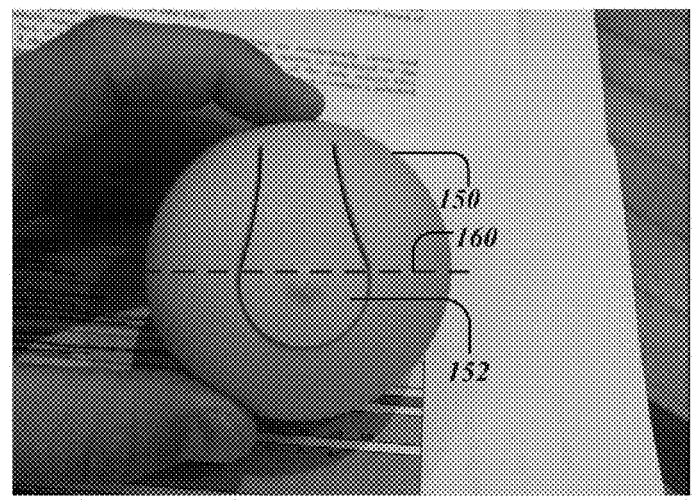
Figure 5C:
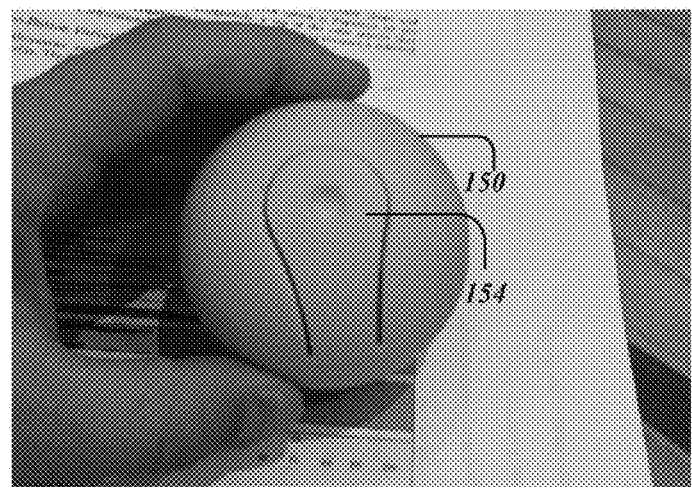

In various other embodiments, a spherical remote control may include one or more buttons that may be used to provide additional functionality. FIGS. 5*a*-5*c* depict a spherically shaped remote control 150 that includes two buttons 152 and 154. The buttons 152 and 154 may be disposed on respective opposite ends 156 and 158. In various embodiments, the buttons may be differentiated from one another either visually or tactilely, or both visually and tactilely. In the example illustrated in FIGS. 5*a*-5*c*, button 152 has a convex shape, while button 154 has a concave shape. In this manner, a user can determine which button is being contacted without having to see the button, for example under low light or dark conditions.

In some embodiments, remote control 150 may include the functionality described above with respect to remote control 138. Thus, navigation through an external user interface may be facilitated by movements of remote control 150, such as tapping or shaking. In addition, in various embodiments buttons 152, 154 may extend the functionality of remote control 150. In particular, various combinations of button selection together with rotational or translational movements of remote control 150 may be used to control different functions in an external device. In some cases, a desired function may be controlled by simultaneously pressing a button while moving remote control 150. In other cases, a desired function may be controlled by sequentially pressing a button and then performing a movement of the remote control 150. For example, according to one embodiment, a user can press either button 152 or button 154 to initiate control of volume of an external device. Once the button is depressed, the volume may be controlled by rotating the remote control 150 about an axis of the remote control. Referring again to FIGS. 5*a* and 5*b*, the user may depress button 152 while rotating the remote control 150 about axis 160. If the user engages button 152 with a thumb, for example, a natural rotation of the wrist may cause the remote control 140 to rotate about axis 160 and thereby increase or decrease volume. In other embodiments, rotation about a different axis, such as an axis orthogonal to axis 160, may control a function such as device audio volume.

In some embodiments, the remote control may be arranged to map the absolute position of the remote control to a function of an external device to be controlled. In some embodiments, an absolute rotational position may be mapped to a function, such as audio volume or brightness of a display. In various other embodiments adjustments of any convenient scalar quantity can be performed in an absolute manner, further extending the intuitive appeal of the remote control 150.

Figure 5D:
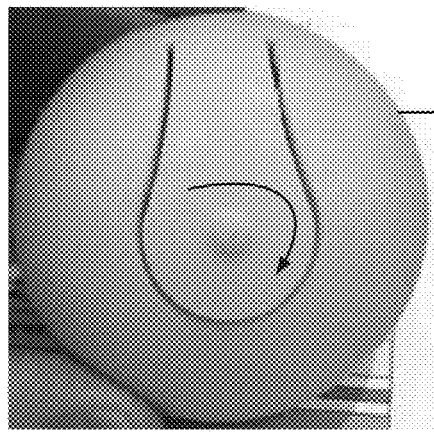
FIGS. 5d-5f illustrate one example of operation of the remote control of FIGS. 5a-5c.
Figure 5D:
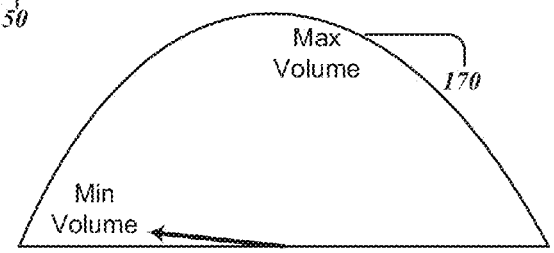
Figure 5E:
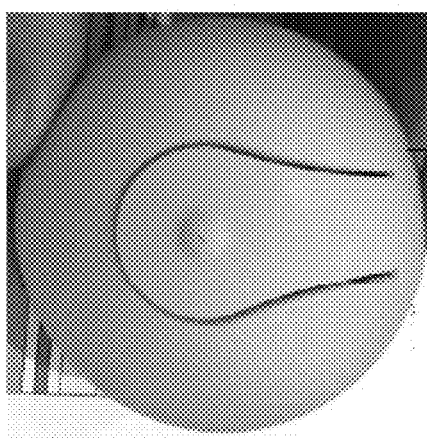
Figure 5E:
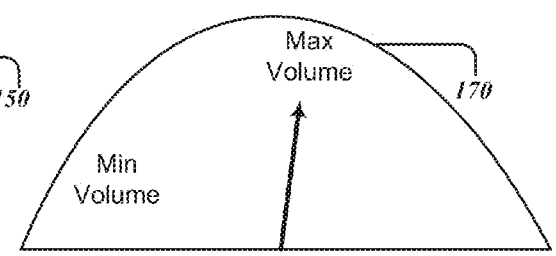
Figure 5F:
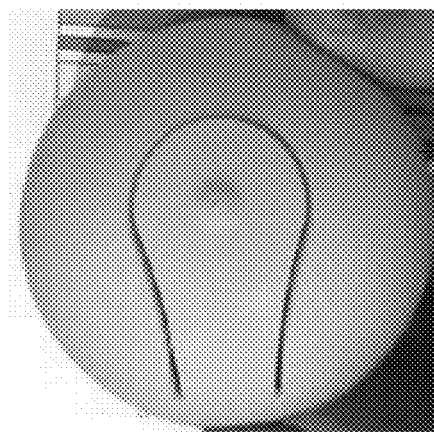
Figure 5F:
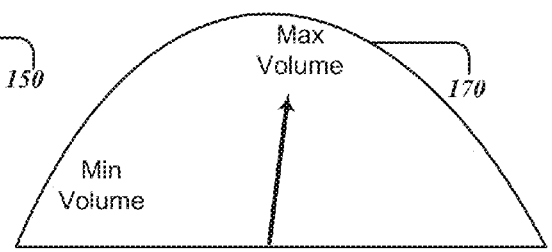

FIGS. 5*d*-5*f* depict operation of the remote control as a "virtual dial" 170 in which the rotational position of the remote control corresponds to a dial position. In FIG. 5*d*, a first orientation of remote control 150 is illustrated. In the example illustrated, this may correspond to a minimum volume of an external speaker to be controlled. When the remote control is rotated, the volume of the external speaker may be increased. The volume may increase as the remote control continues to be rotated until the device reaches a rotational position that corresponds to a maximum volume. This may be accomplished by arranging a processor within the remote control 150 to map a given rotational position of remote control to a maximum volume signal to be transmitted to an external device. The given rotational position may be detected by gyrometers, which forward the positional information to the processor. FIG. 5*e* depicts a second orientation of the remote control 150, which corresponds to a ninety degree rotation of the remote control with respect to the position shown in FIG. 5d. At this second position, the remote control may be arranged to output a signal that sets an external device at a maximum volume, as illustrated. FIG. 5f depicts a third orientation in the remote control 150, in which the remote control is rotated one hundred eighty degrees with respect to the initial orientation depicted in FIG. 5d. As illustrated, the volume output is still at the maximum volume level corresponding to the volume set at the second position illustrated in FIG. 5e. In other words, in this example, rotation of the remote control 150 beyond ninety degrees with respect to the original position of FIG. 5d does not result in further increases in volume of an external device. Thus, the remote control 150 provides a physical experience to the user similar to a dial or knob on a piece of equipment, in which the dial can be rotated between a minimum volume and maximum volume position. Although there is no physical stop that prevents further rotation of the remote control 150, the user is provided with the intuitive sense of a dial, because of the fact that within a rotational range, a given position of the remote control 150 produces a particular volume level, and beyond a certain rotational position, a maximum volume is reached. In the embodiment of FIGS. 5d-5f, the rotation range of the remote control 150 corresponding to the volume range between minimum and maximum volume is ninety degrees. However, in other embodiments, remote control 150 may be arranged to span the range from minimum to maximum volume of a controlled device using a rotation range that is smaller or larger than ninety degrees. A larger rotation range may provide more fine control of volume, while a smaller rotation range may be useful for a user with a limited hand or wrist mobility.

In other embodiments, other functions in an external device may be controlled in a similar manner as noted. This provides a more intuitive and more meaningful control to a user as opposed to incremental "volume up/down" buttons that are typically used in remote controls and other devices. For example, while pressing a "volume up" button a user may have no feel for how much further the volume can be increased, or how many more presses need to be performed to arrive at the desired volume.

In various other embodiments, the absolute position of a remote control may be used to provide pointing functionality. For example, the absolute position, such as a combination of rotational and/or translational position may be used to map the position of an on-screen cursor in a display of an external device. In some embodiments, the cursor may be visible, while in other embodiments, the cursor is implicit.

In other embodiments, a remote control, such as remote control 150, may be arranged to adjust the gain applied to the control signal to enable control of function, such as volume or cursor position of a display, in a non-linear manner. For example, a processor within the remote control can apply a gain to the control signals that is proportional to the rate of rotation of the remote control.

In other embodiments, the remote control may provide haptic feedback, such as providing "clicks" or other indicators that are proportional to the magnitude of the adjustment being made to a controlled function. This may be accomplished through any normal haptic feedback device (e.g., a vibration motor or similar device) integrated as an additional peripheral to the remote control, such as haptic feedback device 139. Referring also to FIGS. 5d-5f, in one embodiment, a "stop click" having a distinctive feel and/or sound could be provided that indicates an end of range of a remote control when further rotation of the remote control will not yield a further change in the controlled function. Thus, a stop click could be provided when the remote control 150 reaches the position illustrated by FIG. 5e, indicating to the user that further rotation will not increase volume in a controlled device.

Figure 6B:
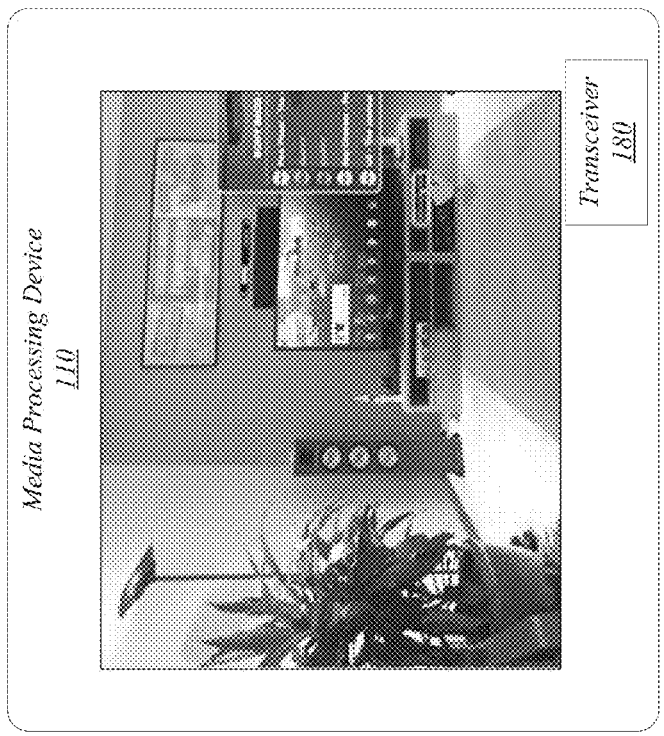
FIGS. 6a and 6b illustrate navigation through a virtual space using an exemplary remote control.
Figure 6B:
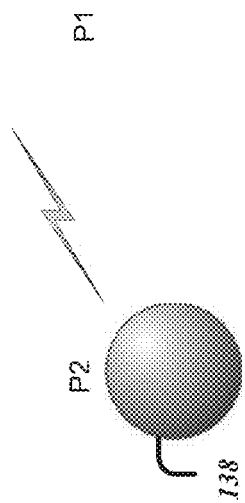
Figure 6A:
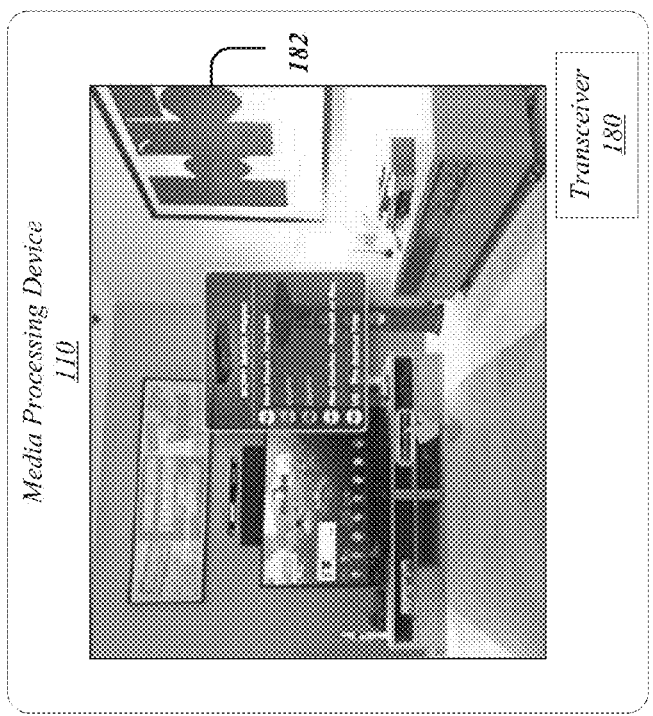
Figure 6A:
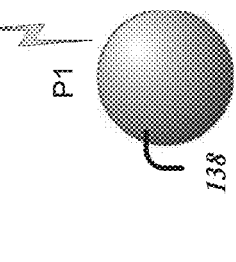

In further embodiments, the movement of a remote control may be mapped to a display device to provide navigation through a virtual space. FIG. 6a depicts a remote control 138 located at a first position P1 with respect to media processing device 110. The media processing device 110 includes a display 182, which provides a view of a scene, such as a virtual room. The remote control 138 may wirelessly communicate using transmitter 128 with a communications component 120, such as a transceiver 180 located in media processing device 110. When the remote control 138 is moved to a second position P2, as illustrated in FIG. 6b, wireless signals transmitted between remote control 138 and media processing device 110 alert the media processing device 110 of the changed position of remote control 138, causing the perspective of the virtual room shown on display 182 is varied, which may simulate the change in perspective that would occur if the user were moving from point P1 to P2 in a real space as depicted by the virtual room.

Figure 7A:
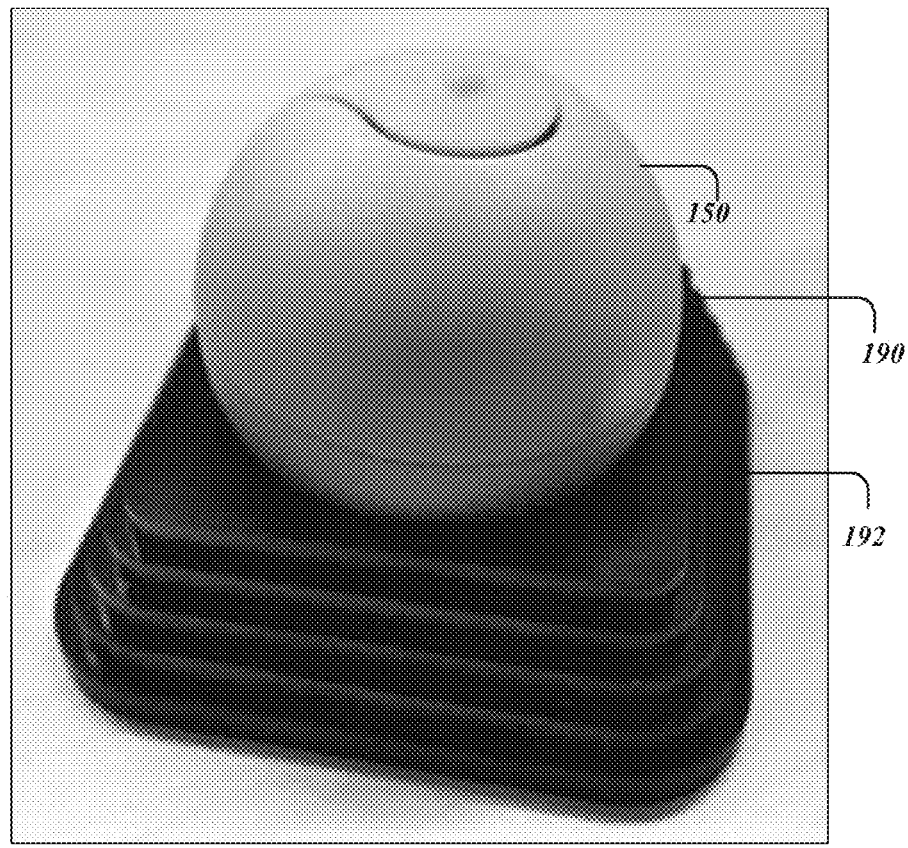
FIGS. 7a and 7b illustrate a perspective view and side view, respectively, of one embodiment of a control system.

In some embodiments, a remote control may be mechanically coupled to another device to provide additional functionality. FIG. 7a depicts a control system 190 that includes a cradle 192 and remote control 150. In some embodiments, after using the remote control 150, a user may place the device in cradle 192 to prevent inadvertent movement of remote control 150 while not in use. The cradle 192 may also act as a charging cradle for the remote control 150. When placed in the cradle 192, the remote control 150 may automatically charge if the charge is depleted. In some embodiments, cradle 192 may also provide trackball capability or similar navigational capability. In this manner, an external device may be controlled using control system 190 according to the capabilities provided by the cradle 192, in addition to those provided by the remote control 150 when acting in a stand-alone capacity.

Figure 7B:
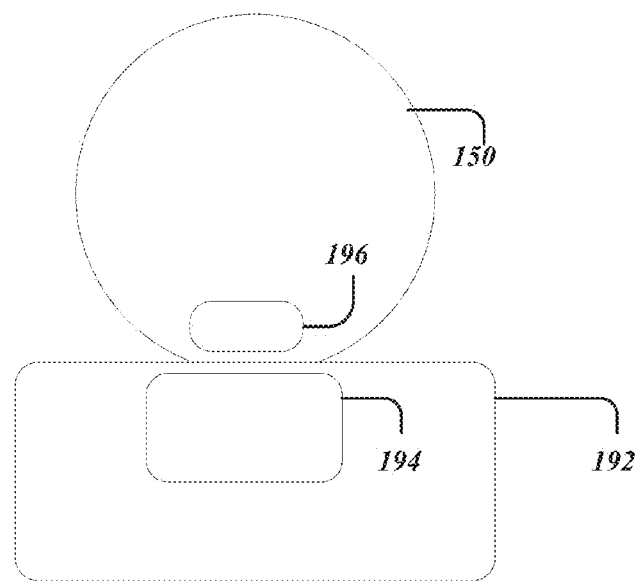

FIG. 7b depicts one embodiment of control system 190, in which cradle 192 includes a charger 194, which may be arranged to charge a receiver 194 in remote control 150 using inductive coupling, for example via a triaxial coil, which facilitates charging of the remote control 150 in any orientation. Thus, a user can be assured that charging will take place without the need to take care in orienting remote control 150 during placement of the remote control within cradle 192. In a different embodiment, the remote control 150 may have electrical contacts for charging via direct electrical connection and may be preferentially weighted so that the portion of the remote control 150 that has electrical contacts tends to rest upon corresponding electrical contacts in the cradle 192.

Figure 8B:
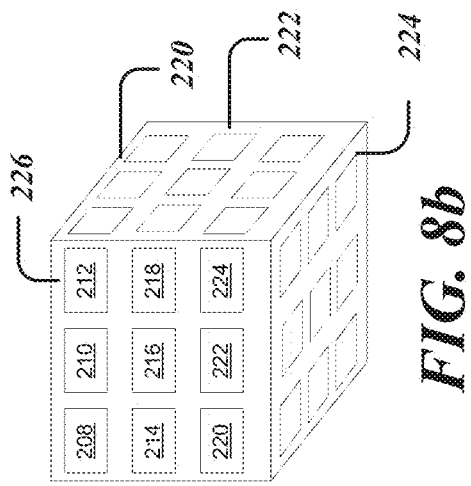
FIG. 8b illustrates another embodiment of a polyhedral remote control.
Figure 8A:
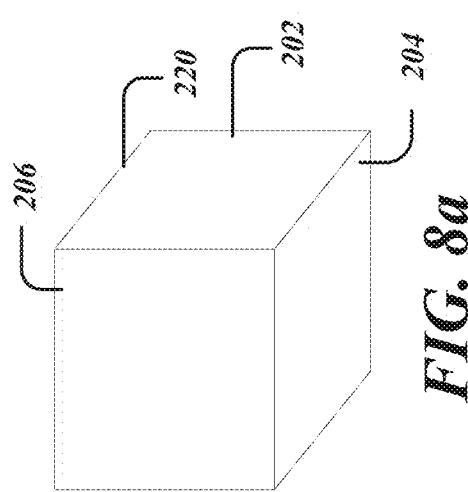
FIG. 8a illustrates one embodiment of a polyhedral remote control.

In various additional embodiments the remote control may have a polyhedral shape, such as a cubic shape. As with a spherical remote control 150, the polyhedral remote control may have a shape and size that is convenient to grasp in a user's hand. FIG. 8a depicts a remote control 220 that has a cubic shape. The remote control 220 has six faces including faces 202, 204, and 206, as well as three others not visible in the orientation shown. In some embodiments, the remote control 220 may provide the functionality described above with respect to spherical remote controls 138 and 150, including the ability to control functions in an external device using changes in the velocity and orientation of the remote control 220.

In various other embodiments, the remote control 220 may be arranged to determine its orientation, its position, or both orientation and position using infrared (IR) devices. In one example, a media processing device 110 may include two or more infrared light emitting devices (LEDs) in fixed locations (not shown), for example, either on a display bezel or elsewhere in a room close to the display. The remote control 220 may also contains IR sensors with directional sensitivity. As it is rotated, the remote control 220 may constantly monitor an apparent intensity of IR LEDs located on or proximate media processing device 110 to determine its position. The IR sensors and IR LEDs can have either wide or narrow emittance and acceptance angles, to yield a narrow or broad angular response. A sharp response can be achieved by simply recessing (in an aesthetically pleasing manner) either or both of the IR sensors and IR LEDs.

In further embodiments, remote control 220 may include one or more buttons or other selection devices, which may be disposed on one or more of the faces of remote control 220. FIG. 8b depicts an embodiment in which the remote control 220 includes multiple selection devices that are distributed on various faces of the remote control 220. As illustrated, face 226 includes selection devices 208-224 arranged in a 3×3 array. In some embodiments, the selection devices may be physical buttons, while in other embodiments the selection devices are virtual buttons or icons that are provided in a touch sensitive surface such as a touch screen provided on one or more faces of the remote control 220. These selection devices may provide additional control functionality to remote control 220 as discussed below.

In various other embodiments, a remote control, such as remote control 150 or 220, may be arranged to determine its orientation, its position, or both orientation and position using infrared (IR) devices. In one example, a media processing device 110 may include two or more infrared light emitting devices (LEDs) in fixed locations (not shown), for example, either on a display bezel or elsewhere in a room close to the display. The remote control 150, 220 may also contains IR sensors with directional sensitivity. As it is rotated, the remote control 220 may constantly monitor an apparent intensity of IR LEDs located on or proximate media processing device 110 to determine its position. The IR sensors and IR LEDs can have either wide or narrow emittance and acceptance angles, to yield a narrow or broad angular response. A sharp response can be achieved by simply recessing (in an aesthetically pleasing manner) either or both of the IR sensors and IR LEDs.

Figure 9:
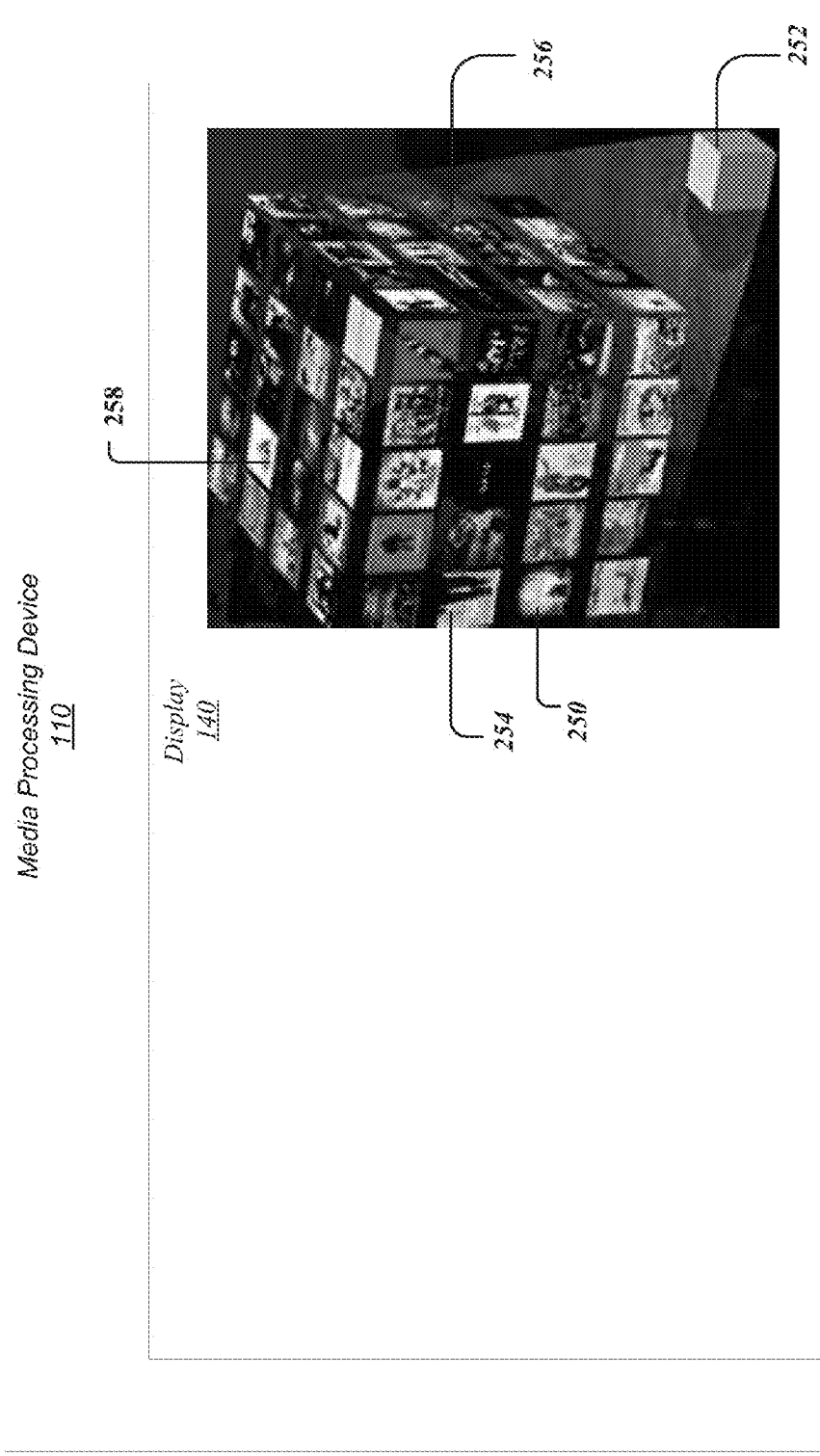
FIG. 9 illustrates an embodiment of a virtual cube.

According to some embodiments, the remote controls, such as remote controls 138, 150 and 220, may interact with a graphical user interface provided in an external device. FIG. 9 depicts an embodiment of a virtual polyhedron (termed "virtual cube" hereinafter), which may be accessed by a remote control and allow a user to peruse and select options from multiple options presented by the virtual cube. As illustrated, the virtual cube may be presented as an icon that displays a small virtual cube 252, and may be presented in an expanded, larger virtual cube 250. The virtual cube 250 may include multiple faces each of which presents one or more options to a user. As illustrated, the virtual cube 250 has multiple faces 254, 256, and 258, each of which provides multiple options to a user.

In some embodiments, the virtual cube may be manipulable so as to rotate into different positions in which different faces are presented to a user. Within each face, such as faces 254, 256, 258, a user may navigate to different options, which may be represented as small icons. In the example of FIG. 9, each face 254, 256, 258 provides a 5×4 matrix of options, which may represent different movies that may be selected by a user to be played on media processing device 110. In some embodiments, a rotational movement of a remote control may be mapped onto virtual cube 250 to control its movements. For example, a user employing remote spherical control 150 may rotate the device about one or more axes in order to rotate virtual cube 250 in display 140. In one example, the virtual cube 250 may be defined by three mutually orthogonal rotational axes (not shown), which are matched by corresponding rotational axes (also not shown) within the remote control 150. Thus, referring again to FIGS. 5a-5c, the rotation of remote control 150 around axis 160 may engender a corresponding rotation of virtual cube 250 along a corresponding axis. This may bring one or more different faces into view depending on the amount of rotation imparted to the remote control 150. In various embodiments, only one cube face of the virtual cube 250 may be navigable at any one time, such that individual options within the cube face may be accessed and/or selected by a user. In some embodiments, the currently navigable cube face of virtual cube 250 may be highlighted or shown in a fixed position and/or fixed orientation. For example, in alternative embodiments, the forwardly facing face 254 or the upwardly facing face 258 may serve as the currently navigable cube face.

Once a cube face of the virtual cube 250 is brought into view that has options of interest to the user, the user may proceed to navigate within a face to select an individual option. For example, depressing a button 152 on remote control 150 in conjunction with a imparting a translational movement or rotational movement to remote control 150 may cause navigation between icons that are displayed within a face of the virtual cube 250.

In embodiments involving the use of polyhedral remote control 220, the navigation between different faces of virtual cube 250 may also be accomplished by rotating remote control 220 around one or more rotation axes. In embodiments of remote control 220 in which one or more faces include multiple selection devices, as illustrated in FIG. 8b, the multiple selection devices may map onto one or more icons provided on the faces of the virtual cube 250. In some embodiments, the remote control 220 may include one or more display screens (not shown) on one or more corresponding faces of the remote control, for example, on faces 202, 204, and 206. In particular embodiments, the displays on remote control 220 may be synchronized with the images (icons) presented on virtual cube 250. For example, if virtual cube 250 has three virtual faces 254, 256, 258 that each have a specific 5×4 matrix of icons that represent different options, the remote control 220 may also have three faces in which each face displays a 5×4 matrix of options corresponding to that shown in a face of virtual cube 250. The remote control 220 may be arranged to update its display as the virtual cube 250 is updated so that the same options appear on the virtual cube 250 as on the real remote control 220. For example, remote control 220 may include a receiver (see receiver 129 of FIG. 3b) that receive a wireless signal from a device that displays the virtual cube 250 to synchronize the virtual cube 250 and the display on remote control 220. This allows a user to focus on the virtual cube 250 for navigation rather than the physical remote control 220, since each selection device on the remote control 220 may have a corresponding icon shown on the virtual cube 250.

However, in other embodiments, the remote control 220 may have fewer or more icons displayed in a face as compared to those shown in virtual cube 250. In other embodiments, in addition to, or instead of a display screen, the remote control may have one button or an array of buttons that allow selection and navigation through different options on the face of a virtual cube.

In accordance with some embodiments, the remote control 220 may be arranged to inactivate selection devices on the surface of remote control 220 during motion of the remote control. One or more physical buttons or virtual buttons or icons may be rendered inoperable when the remote control 220 detects that it is undergoing a motion, such as a rotation. Thus, for example, while a user is rotating the remote control 220 to change the active face of a virtual cube 250 shown in display 140, the selection devices 208 to 224 and other selection devices on other faces of remote control 220 may be deactivated. This allows a user to conveniently grasp the remote control 220 and control an external device through desired rotational and translational movements without having to avoid touching buttons or regions of a touch screen that be distributed over many portions of the surface of the remote control 220.

In various other embodiments, a user may employ a remote control 150 or remote control 220 to navigate through a virtual cube having more faces than a corresponding physical cube. FIGS. 10a-10i depict multiple faces of a virtual cube 270, in which the total number of faces may be greater than the six faces of a physical cube. Referring also to FIGS. 11a-11i, when a user places a remote control 290 in a first position indicated by the mark 292 position at, a first face 272 is presented to the user in an active position, that is, with the active face displayed forwardly and providing icons 296 that may be selected. When the remote control 290 is rotated about a vertical axis 296 as indicated in the series of FIGS. 11b-11i, virtual cube 270 appears to rotate about an axis 298, such that other faces of the virtual cube 270 may reveal themselves in the active position. For example, after a ninety degree rotation of remote control 290, illustrated in FIG. 11b, face 274 appears in the active position of virtual cube 270, while face 272 appears to be rotated ninety degrees to face sideward. Each further ninety degree rotation of remote control 290 produces additional faces 276-286. For example, in 11c, mark 292 has been rotated one hundred eighty degrees from the position of FIG. 10a, and the face 276 appears outwardly, while the face 274 faces sideward. However, after a three hundred sixty degree rotation of controller 290, where mark 292 is restored to its original position in physical space as shown in FIG. 11e, in virtual space an outwardly facing face 280 is displayed on virtual cube 270, rather than the original face 272. Further rotation of remote control 290 produces a succession of new virtual faces 282-286 facing outwardly until the remote control 290 has been rotated through two full turns (FIG. 11i) at which point, face 272 appears outwardly again (FIG. 10i). Thus, in the illustrated embodiment virtual cube 270 has eight virtual faces when the cube is rotated on its vertical axis 298, rather than four, which would be observed in a real space cube. It is to be noted that in other embodiments other operations may be performed on remote control 290 to navigate through a virtual cube. These other operations may be used in conjunction with, or separate from rotational movements, and include translational movement of the remote control, tapping or shaking the device, and pressing of physical or virtual buttons, among other operations.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 12A:
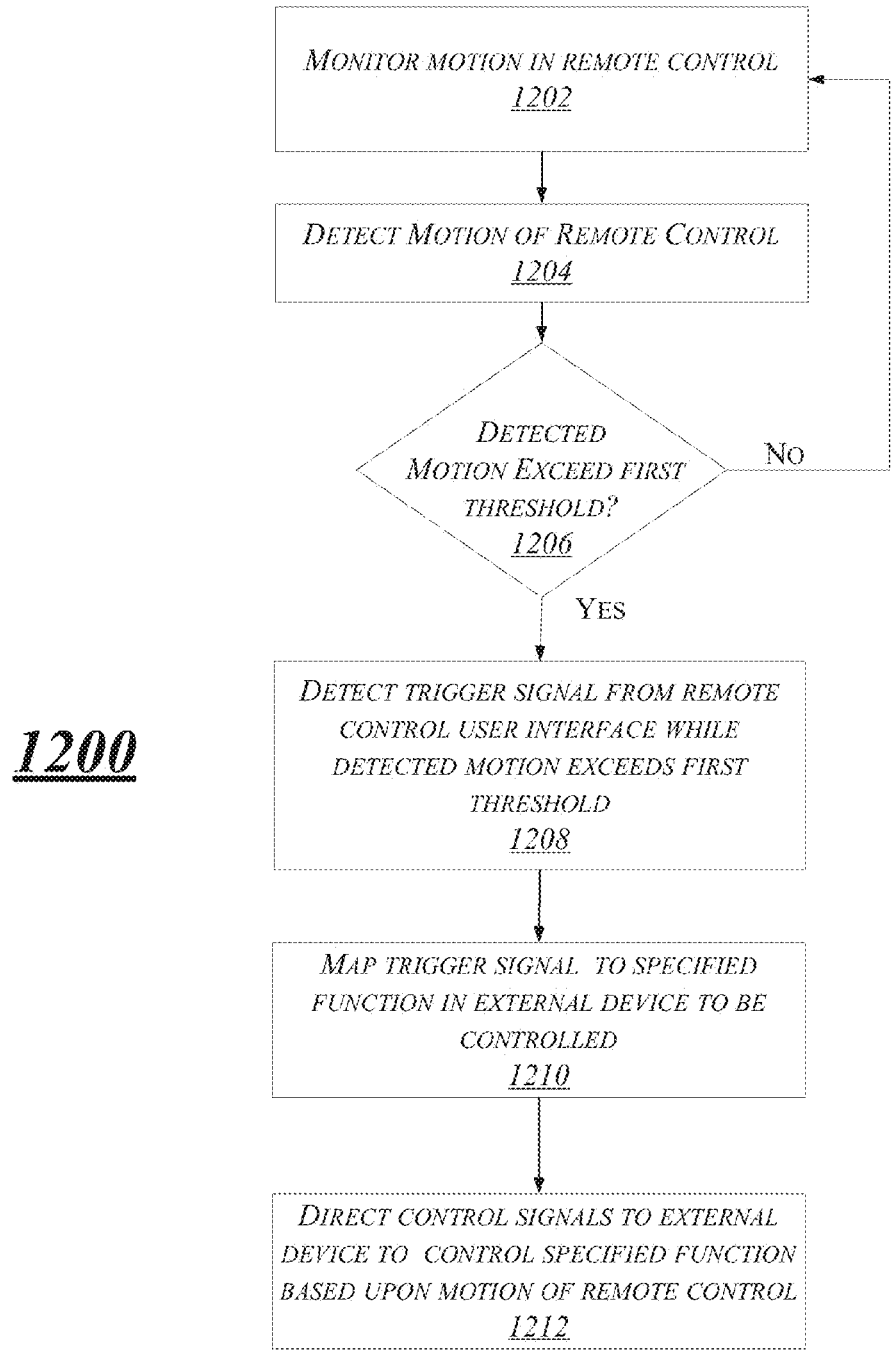
FIG. 12a illustrates a logic flow according to another embodiment.

FIG. 12a depicts one embodiment of a logic flow 1200. The logic flow 1200 may be representative of some or all of the operations executed by one or more embodiments described herein. The embodiments are not limited to this example. At block 1202 the motion in a remote control is monitored. This may take place using an inertial measurement unit in some embodiments. At block 1204 motion within the remote control is detected. The motion may be any combination of translation and rotational movement in some embodiments. The detected motion may also provide information concerning the position of the remote control, the direction of travel (translation), the direction of rotation of the remote control, velocity of the remote control, and acceleration of the remote control.

At block 1206, if the detected motion does not exceed a first threshold, the flow returns to block 1202. If the detected motion exceeds a first threshold, the flow proceeds to block 1208. At block 1208 a trigger signal sent from a remote control user interface is detected. The trigger signal is detected at the same time as motion of the remote control is detected. At block 1210, the trigger signal is mapped to a function to be controlled in an external device. For example, the trigger signal may be received from a button in the remote control and may be used to initiate volume control in an external audio component. At block 1212, control signals are directed to an external device to control the specified function based upon the movement of the remote control. For example, while the motion of the remote control is detected, the motion may be used to control the change in volume of the external device.

Figure 12B:
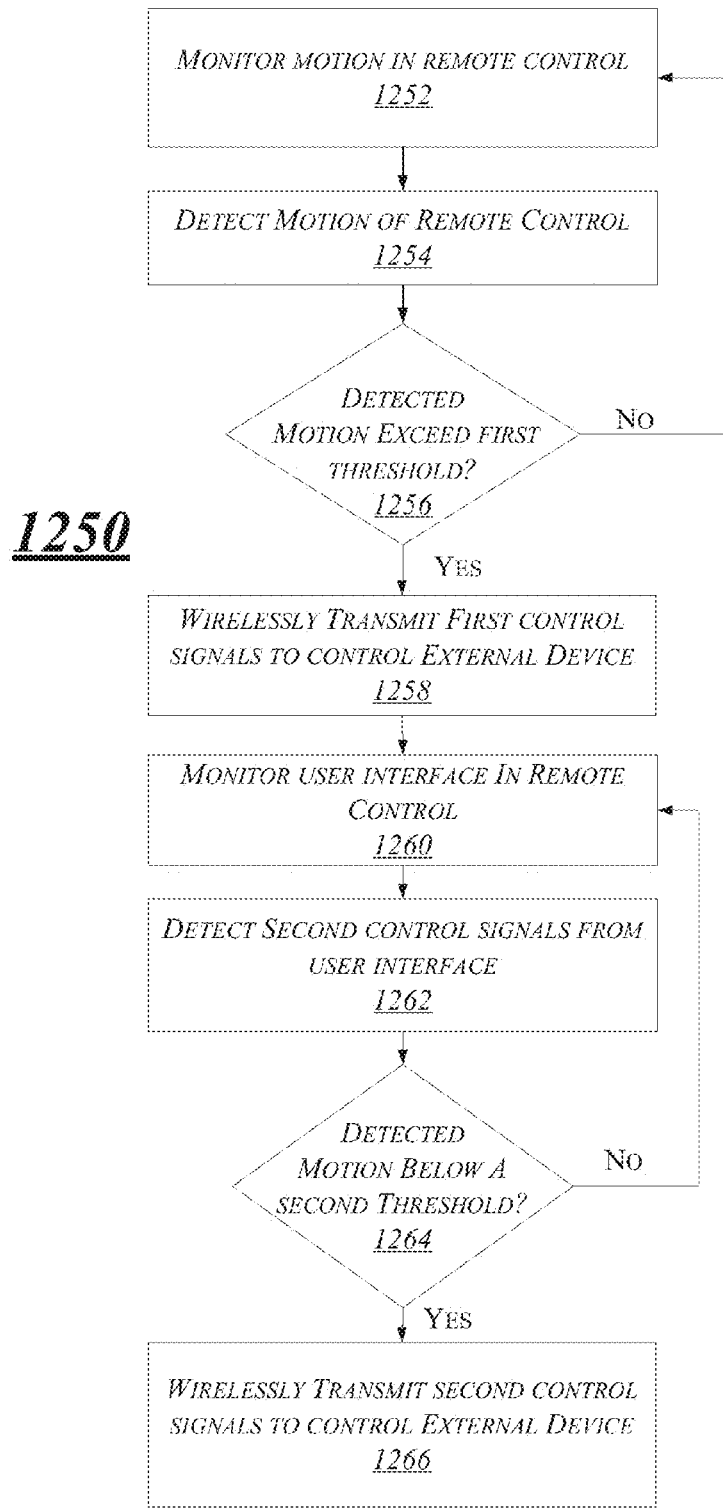
FIG. 12b illustrates a logic flow according to a further embodiment.

FIG. 12b depicts another logic flow 1250 consistent with further embodiments. At block 1252 motion of the remote control is monitored and at block 1254 motion in the remote control is detected. At block 1256, if the motion is below a first threshold, the logic flow returns to block 1252. If the detected motion is above the threshold, the logic flow moves to block 1258. At block 1258, control signals are wirelessly transmitted to a control at least one operation in an external device. The wirelessly transmitted control signals may control the external device based upon the nature and extent of the motion in the remote control detected. For example, a detected rotational motion may cause a virtual object in an external display to move. In one particular example, a virtual polyhedron may rotate between different faces of the polyhedron.

At block 1260 a user interface in the remote control is monitored. The user interface may be a selection device, such as a physical or virtual button in some embodiments. At block 1262 second control signals are detected from the user interface. For example a specific depressed button on a surface of the remote control may trigger second control signals to be detected by a processor in the remote control. The second control signals may be designed to invoke an option that is presented by the external device. In one example, the option may be a selection represented by an individual icon on the face of a virtual polyhedron. At block 1264, if the detected motion of the remote control is not below a second threshold, the logic flow returns to block 1260. If the detected motion is below a threshold, for example, if the remote control is no longer rotating, the logic flow moves to block 1266, where the second control signals are sent to control the external device. In this manner the second control signals, such as a user selection are not sent until the remote control is no longer in motion, preventing inadvertent selection of an option when a button or icon on a remote control is accidentally pressed while being grasped to rotate the remote control.

Figure 13:
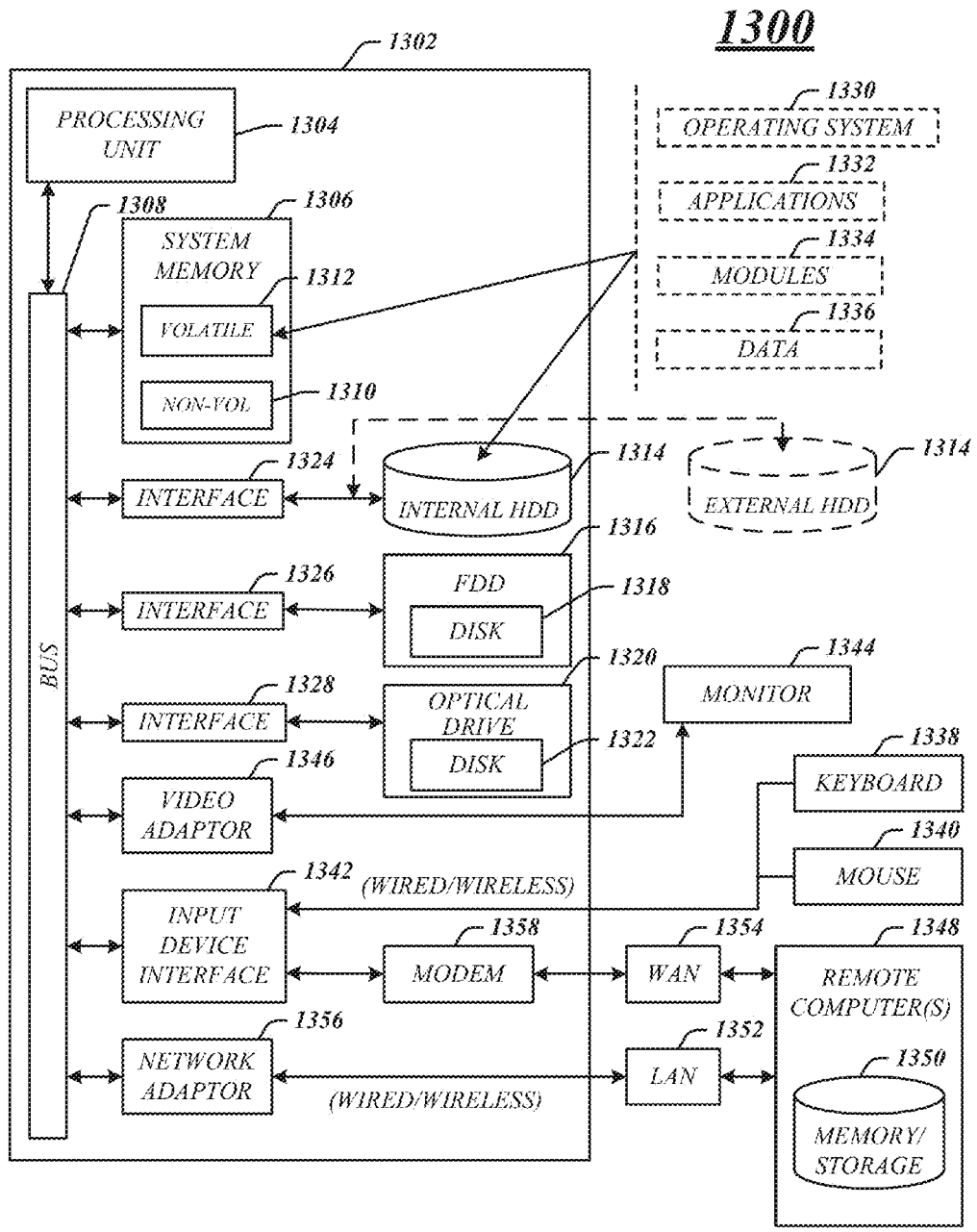
FIG. 13 illustrates one embodiment of a computing architecture.

FIG. 13 illustrates an embodiment of an exemplary computing architecture 1300 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1300 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors. Dual microprocessors and other multi processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The computing architecture 1300 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336.

A user can enter commands and information into the computer 1302 through one or more wire/wireless input devices, for example, a keyboard 1338 and a pointing device, such as a mouse 1340. Other input devices may include a microphone, an infra-red (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
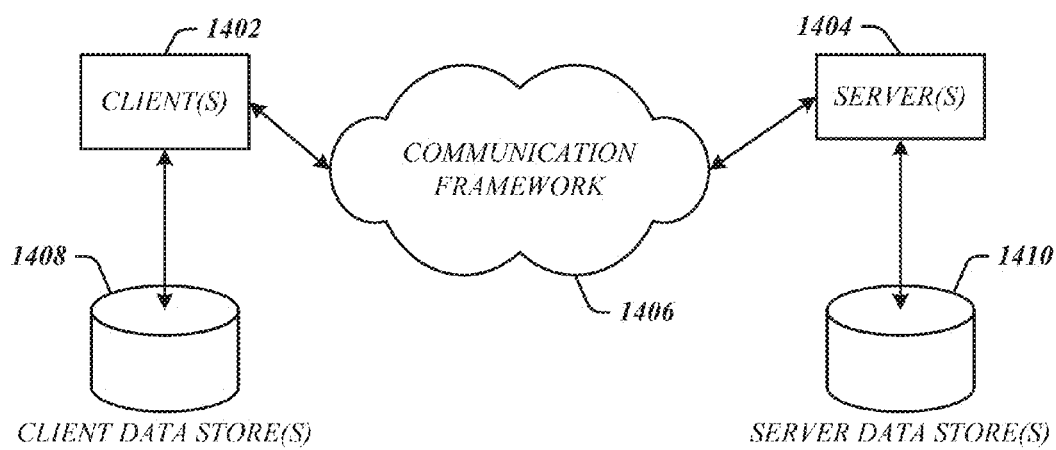
FIG. 14 illustrates one embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, and so forth. The embodiments, however, are not limited to implementation by the communications architecture 1400.

As shown in FIG. 14, the communications architecture 1400 comprises includes one or more clients 1402 and servers 1404. The clients 1402 may implement the client systems 310, 400. The servers 1404 may implement the server system 330. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols, such as those described with reference to system 1300. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a housing comprising a substantially equiaxed shape, the housing comprising a plurality of cube faces;
   a motion sensor arranged to detect a rotational state of the housing; and
   a processor arranged to produce control signals based upon the rotational state, the control signals to control operation of an external device and to include an indication to rotate a virtual cube in response to a rotation of the housing, the virtual cube comprising a plurality of virtual cube faces, each one of the plurality of cube faces corresponding to a different one of the plurality of virtual cube faces.

2. The apparatus of claim 1, comprising:
   a set of accelerometers to determine an acceleration state of the housing in at least one direction;
   and a set of gyroscopes to determine an orientation state of the housing.

3. The apparatus of claim 2, comprising, a transmitter arranged to wirelessly transmit the control signals to the external device.

4. The apparatus of claim 3, the external device comprising at least one of a display and an audio device, the external device being arranged to change at least one of audio output and an image presented on the display in response to the control signals transmitted from the transmitter.

5. The apparatus of claim 1, comprising a first and second button disposed on a surface of the housing, wherein the first button has a different tactile quality than the second button.

6. The apparatus of claim 5, the first button comprising a concave shape and the second button comprising a convex shape.

7. The apparatus of claim 3, each of the plurality of virtual cube faces providing one or more icons that each represent a portion of a matrix of selections, the transmitter arranged to transmit the control signal to direct an operation by selecting an icon when that icon is displayed on an active virtual cube face of the virtual cube.

8. The apparatus of claim 4, the display arranged to show a virtual space, wherein movement of the housing changes perspective in the virtual space.

9. The apparatus of claim 1, comprising a virtual dial arranged to control one or more functions on an external device, wherein a maximum of the virtual dial is defined by an absolute rotational position of the apparatus.

10. The apparatus of claim 1, comprising one or more selection devices arranged on a surface of the housing to receive user input, wherein the apparatus is arranged to inactivate the selection devices during motion of the housing.

11. A system, comprising;
    a housing of a remote control having a substantially equiaxed shape, the housing comprising a plurality of cube faces;
    a sensor arranged to detect a rotational state of the remote control;
    a selection device disposed on a surface of the housing; and
    a processor arranged to control visual appearance of a virtual cube in response to changes in the rotational state of the remote control, the virtual cube comprising a plurality of virtual cube faces, each one of the plurality of cube faces corresponding to a different one of the plurality of virtual cube faces.

12. The system of claim 11, the remote control comprising a set of accelerometers to determine an acceleration state of the apparatus in at least one direction;
    a set of gyroscopes to determine an orientation state of the apparatus; and
    a transmitter arranged to wirelessly transmit control signals to a display upon which the virtual cube is displayed, the control signals based upon one or more of the acceleration state and orientation state.

13. The system of claim 12, each of the plurality of virtual cube faces providing one or more icons that each represent a portion of a matrix of selections, the transmitter arranged to transmit control signals to:
    direct an operation by selecting an icon when that icon is displayed on an active virtual cube face of the virtual cube.

14. The system of claim 11, the remote control comprising a virtual dial arranged to control one or more functions on the display, wherein a maximum of the virtual dial is defined by a rotational position of the apparatus.

15. The system of claim 11, comprising a cradle arranged to provide tracking navigational capability to the remote control when the remote control is placed in the cradle.

16. An article comprising a non-transitory computer-readable storage medium containing instructions that when executed by a processor enable a system to:
    receive motion information at a first instance of a remote control device, the remote control device comprising a housing having a plurality of cube faces;
    send at least one control directive to a wireless transceiver to wirelessly transmit first control signals based upon the detected motion to an external device so as to control one or more functions in the external device when the detected motion is above a first threshold, the first control signals to control motion of a virtual cube displayed on the external device, the virtual cube comprising a plurality of virtual cube faces, each one of the plurality of cube faces corresponding to a different one of the plurality of virtual cube faces; and
    send control directives to the wireless transceiver to wirelessly transmit at a second instance second control signals based upon a selection received from a user interface of the remote control device when detected motion of the remote control device is below a second threshold.

17. The article of claim 16, containing instructions that when executed by a processor enable a system to receive motion information including one or more of: acceleration values received from a set of accelerometers in the remote control device, and rotational values received from a set of gyroscopes in the remote control device.

18. The article of claim 16, the virtual cube arranged to present an active face, the article comprising instructions that when executed by a processor enable a system to send control directives to the wireless transmitter to:
    transmit the second control signals to choose a selection displayed upon the active face of the virtual cube.

19. The article of claim 16, containing instructions that when executed by a processor enable a system to:
    determine a first rotational position of the remote control device;
    determine a reference rotational position of the remote control device; and
    produce an intensity of a first control signal that is proportional to a difference between the first rotational position and the reference rotational position.

20. The article of claim 16 containing instructions that when executed by a processor enable a system to set a maximum signal intensity of the first control signals that corresponds to a predetermined rotational position of the remote control device.

21. The article of claim 16 containing instructions that when executed by a processor enable a system to:
   detect a trigger signal from a user interface of the remote control device during the detecting the motion at the first instance;
   map the trigger signal to a specified function to be controlled; and
   direct control signals to control the specified function in the external device.

22. A method, comprising:
   detecting motion at a first instance of a remote control device within said remote control device, the remote control device comprising a housing having a plurality of cube faces;
   wirelessly transmitting first control signals based upon the detected motion to an external device so as to control one or more functions in the external device when the detected motion is above a first threshold, the first control signals to control motion of a virtual cube displayed on the external device, the virtual cube comprising a plurality of virtual cube faces, each one of the plurality of cube faces corresponding to a different one of the plurality of virtual cube faces; and
   wirelessly transmitting at a second instance second control signals based upon a selection received from a user interface of the remote control device when detected motion of the remote control device is below a second threshold.

23. The method of claim 22, comprising detecting one or more of:
   acceleration values received from a set of accelerometers in the remote control device, and rotational values received from a set of gyroscopes in the remote control device.

24. The method of claim 22, comprising:
   determining a first rotational position of the remote control device;
   determining a reference rotational position of the remote control device; and
   producing an intensity of a first control signals that is proportional to a difference between the first rotational position and the reference rotational position.

25. The method of claim 22, the virtual cube arranged to present an active face, the method comprising transmitting the second control signals to choose a selection displayed upon the active face of the virtual cube.

26. The method of claim 22, comprising:
   detecting a trigger signal from a user interface of the remote control device during the detecting the motion at the first instance;
   mapping the trigger signal to a specified function to be controlled; and
   directing control signals to control the specified function in the external device.

* * * * *